United States Patent
Tang et al.

(10) Patent No.: US 11,049,261 B2
(45) Date of Patent: Jun. 29, 2021

(54) METHOD AND SYSTEM FOR CREATING VIDEO ABSTRACTION FROM IMAGE DATA CAPTURED BY A MOVABLE OBJECT

(71) Applicant: SZ DJI TECHNOLOGY CO., LTD., Shenzhen (CN)

(72) Inventors: Ketan Tang, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 166 days.

(21) Appl. No.: 16/353,721

(22) Filed: Mar. 14, 2019

(65) Prior Publication Data

US 2019/0213742 A1 Jul. 11, 2019

Related U.S. Application Data

(63) Continuation of application No. PCT/CN2016/100386, filed on Sep. 27, 2016.

(51) Int. Cl.
| | |
|---|---|
| *G06T 7/246* | (2017.01) |
| *H04N 21/2343* | (2011.01) |
| *H04N 21/8549* | (2011.01) |
| *G06K 9/00* | (2006.01) |
| *H04N 21/845* | (2011.01) |

(52) U.S. Cl.
CPC .......... *G06T 7/246* (2017.01); *G06K 9/00711* (2013.01); *H04N 21/234318* (2013.01); *H04N 21/8456* (2013.01); *H04N 21/8549* (2013.01); *G06T 2207/10016* (2013.01); *G06T 2207/10032* (2013.01)

(58) Field of Classification Search
CPC . G06T 2207/10016; G06T 2207/10032; G06T 7/70; G06T 7/246; G06K 9/00711; G06K 9/00771; G06K 9/00744; G06K 9/00738; H04N 21/8456; H04N 21/8549; H04N 21/234318
USPC ......................................................... 382/103
See application file for complete search history.

(56) References Cited

U.S. PATENT DOCUMENTS

| | | | |
|---|---|---|---|
| 7,843,512 B2 * | 11/2010 | Mohamed | H04N 5/147 348/700 |
| 2007/0183497 A1 | 8/2007 | Luo et al. | |
| 2011/0292245 A1 | 12/2011 | Deever | |
| 2012/0148149 A1 | 6/2012 | Kumar et al. | |
| 2013/0215221 A1 | 8/2013 | Wang et al. | |
| 2015/0325003 A1 | 11/2015 | Cleveland et al. | |

(Continued)

FOREIGN PATENT DOCUMENTS

| | | |
|---|---|---|
| CN | 1801916 A | 7/2006 |
| CN | 105807786 A | 7/2016 |

*Primary Examiner* — Daniel G Mariam
(74) *Attorney, Agent, or Firm* — Anova Law Group, PLLC

(57) ABSTRACT

A method for processing image data captured by an imaging device borne on a movable object includes receiving a plurality of trigger events each corresponding to an operational condition variation detected by a first sensing device borne on the movable object, identifying, among a sequence of image frames captured by the imaging device, a plurality of image frames of interest each determined by one of the plurality of trigger events, and adaptively selecting, from the sequence of image frames, a set of image frames in accordance with a comparison of a plurality of temporally adjacent image frames of the plurality of image frames of interest.

18 Claims, 14 Drawing Sheets

(56) References Cited

U.S. PATENT DOCUMENTS

| | | |
|---|---|---|
| 2016/0026874 A1 | 1/2016 | Hodulik et al. |
| 2016/0142730 A1 | 5/2016 | Gurbuz |
| 2018/0046187 A1* | 2/2018 | Martirosyan .......... G05D 1/106 |

* cited by examiner

700

---

702
Receive a plurality of trigger events, a respective trigger event of the plurality of trigger events corresponding to an operational condition variation detected by a first sensing device borne on the movable object.

---

704
In response to the plurality of trigger events, identify, among a sequence of image frames captured by the imaging device, a plurality of image frames of interest, each identified image frame of interest determined by one of the plurality of trigger events.

---

706
Adaptively select, from the sequence of image frames, a set of image frames in accordance with an analysis of a plurality of temporally adjacent image frames of the plurality of image frames of interest.

---

708
Provide the selected set of image frames for displaying continuously.

710
Receiving the plurality of trigger events comprises receiving a notification of identifying a keyframe from a visual odometry (VO) system borne on the movable object.

712
The plurality of trigger events correspond to a timing attribute of an image frame captured by the imaging device satisfying a predetermined criterion.

714
The plurality of trigger events correspond to a positional change of the movable object satisfying predetermined criteria.

716
The plurality of trigger events correspond to a positional change of a carrier borne by the movable object and configured to carry the imaging device satisfying a predetermined criterion.

718
The plurality of trigger events correspond to a plurality of keyframes determined based on a plurality of images captured by the imaging device borne on the movable object.

720
Compare attitude information of the imaging device and attitude information of the VO system; and
in accordance with a determination that a difference between the attitude information of the imaging device and the attitude information of the VO system satisfies a first predetermined criterion, identify the plurality of image frames of interest that are temporally related to the keyframe identified by the VO system.

721
Compare attitude information of the imaging device and attitude information of the VO system; and
in accordance with a determination that a difference between the attitude information of the imaging device and the attitude information of the VO system satisfies a second predetermined criterion, discarding one or more keyframes detected by the VO system.

722
Compare attitude information of the imaging device and attitude information of the VO system; and
in accordance with a determination that a difference between the attitude information of the imaging device and the attitude information of the VO system satisfies a second predetermined criterion, identify the plurality of image frames of interest using a model for predicting timing for an image frame of interest to occur.

723
The difference between the attitude information of the imaging device and the attitude information of the VO system satisfies the second predetermined criterion comprises:
the difference between orientation angles of the imaging device and orientation angles of the VO system is equal to or greater than a predetermined threshold value.

724
The model is created using data including time stamps of previously identified image frames of interest and one or more trigger events associated with the previously identified image frames of interest respectively.

725
The one or more trigger events correspond to image content change.

726
The one or more trigger events correspond to previously identified keyframes by the VO system.

727
The one or more trigger events correspond to state change of the movable object.

730
Compare a respective pair of consecutive image frames from the identified plurality of image frames of interest, the respective pair of temporally consecutive image frames including a first image frame and a second image frame subsequent to the first image frame.

732
In accordance with a determination that a difference in image content between the first image frame and the second image frame is greater than a predetermined threshold, select, from the sequence of image frames, a first group of image frames captured between the first image frame and the second image frame to be included in the set of image frames.

734
Verify identified plurality of image frames of interest by:

736
Compare image content of a plurality of consecutive image frames from the identified plurality of image frames of interest.

738
In accordance with a determination that the plurality of consecutive image frames have differences in image content that are equal to or below the predetermined threshold, exclude one or more image frames of interest from the plurality of consecutive image frames from the set of image frames.

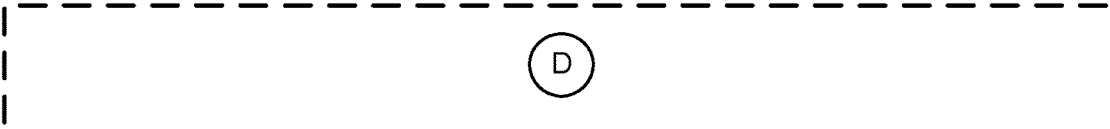

750
Identifying the plurality of image fames of interest, adaptively selecting the set of image frames, and providing the selected set of image frames for displaying continuously are performed in real time as the imaging device captures the sequence of image frames continuously.

752
Identifying the plurality of image fames of interest, adaptively selecting the set of image frames, and providing the selected set of image frames for displaying continuously are performed after the imaging device finishes capturing the sequence of image frames continuously.

Figure 7F

METHOD AND SYSTEM FOR CREATING VIDEO ABSTRACTION FROM IMAGE DATA CAPTURED BY A MOVABLE OBJECT

CROSS-REFERENCE TO RELATED APPLICATION

This application is a continuation of International Application No. PCT/CN2016/100386, filed on Sep. 27, 2016, the entire contents of which are incorporated herein by reference.

TECHNICAL FIELD

The disclosed embodiments relate generally to operating a movable object and more particularly, but not exclusively, to providing video abstraction for a movable object.

BACKGROUND

Movable objects such as unmanned aerial vehicles (UAVs) can be used for performing surveillance, reconnaissance, and exploration tasks for military and civilian applications. A movable object may carry a payload configured to perform a specific function. For example, the payload may include an imaging device for capturing image data of the surrounding environment for creating video content and/or for detecting and avoiding obstacles in the surrounding environment. As the amount of data of the captured image data increases, it is important to identify content of interest efficiently and accurately for creating video abstraction.

SUMMARY

There is a need for systems and methods for devices that process image data for creating video abstraction based on image data captured by an imaging device borne by a movable object. Such systems and methods optionally complement or replace conventional methods for processing image data. By identifying image data of interest based on sensor data obtained from one or more sensors borne by the movable object and by selecting relevant image data for creating the video abstraction, some embodiments of the present application can significantly improve the efficiency and accuracy in image data processing and video abstraction creation. Additionally, the image processing techniques as disclosed herein can be performed after or in real time as the movable object moves along a path and captures image data.

In accordance with some embodiments, a method for identifying a plurality of image frames of interest captured by an imaging device borne on a movable object comprises: receiving a plurality of trigger events. A respective trigger event of the plurality of trigger events corresponds to an operational condition variation detected by a first sensing device borne on the moveable object. In response to the plurality of trigger events, the method further comprises identifying a plurality of image frames of interest among a sequence of image frames captured by the imaging device. Each identified image frame of interest is determined by one of the plurality of trigger events. The method further comprises adaptively selecting a set of image frames from the sequence of image frames in accordance with a comparison of a plurality of temporally adjacent image frames of the plurality of image frames of interest.

In accordance with some embodiments, an unmanned aerial vehicle (UAV) may comprise a propulsion system, one or more sensors, an imaging device, and one or more processors coupled to the propulsion system, the one or more sensors, and the imaging device. The one or more processors are configured for performing the operations of the above method. In accordance with some embodiments, a system may comprise an imaging device; one or more processors coupled to the imaging device; memory; and one or more programs. The one or more programs are stored in the memory and configured to be executed by the one or more processors. The one or more programs including instructions for performing the operations of the above method. In accordance with some embodiments, a non-transitory computer-readable storage medium has stored therein instructions that, when executed by the movable object, cause the movable object to perform the operations of the above method.

BRIEF DESCRIPTION OF THE DRAWINGS

FIGS. 7A-7F are a flow diagram illustrating a method for processing image data captured by an imaging device borne on a movable object, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. In some embodiments, the movable object also includes, but is not limited to, a self-driving car (i.e., an autonomous car, a driverless car), a virtual reality (VR) headset, an augmented reality (AR) headset, a handheld gimbal with a camera and image processing capabilities. It will be apparent to those skilled in the art that other types of movable objects may be substituted for UAVs as described below, such as a mobile phone, a tablet, or a remote control.

The present disclosure provides techniques related to processing image data captured by an imaging device borne on a UAV for creating video abstraction. In some embodiments, a plurality of image frames are captured using an imaging device borne by a UAV as the UAV moves along a navigation path. Image processing techniques disclosed in the present application are used to process the captured image frames by identifying one or more image frames of interest that are determined by trigger events detected by one or more sensors borne by the UAV. The identified image frames of interest are further analyzed to adaptively select a set of image frames to be included in the video abstraction from the plurality of image frames captured by the imaging device borne by the UAV. For example, a plurality of temporally adjacent image frames of the plurality of image frames of interest are compared to exclude false alarms, to determine sampling rate for selecting the set of image frames, and/or to add or reduce keyframes. The trigger events can be detected by one or a combination of sensors including, but not limited to, a visual odometry (VO) system, the imaging device, an inertial measurement unit (IMU), and a gimbal system. Efficient (e.g., real-time processing or post processing) and accurate image processing and video abstraction creation can be achieved using the image processing techniques disclosed in the present application.

Figure 1:
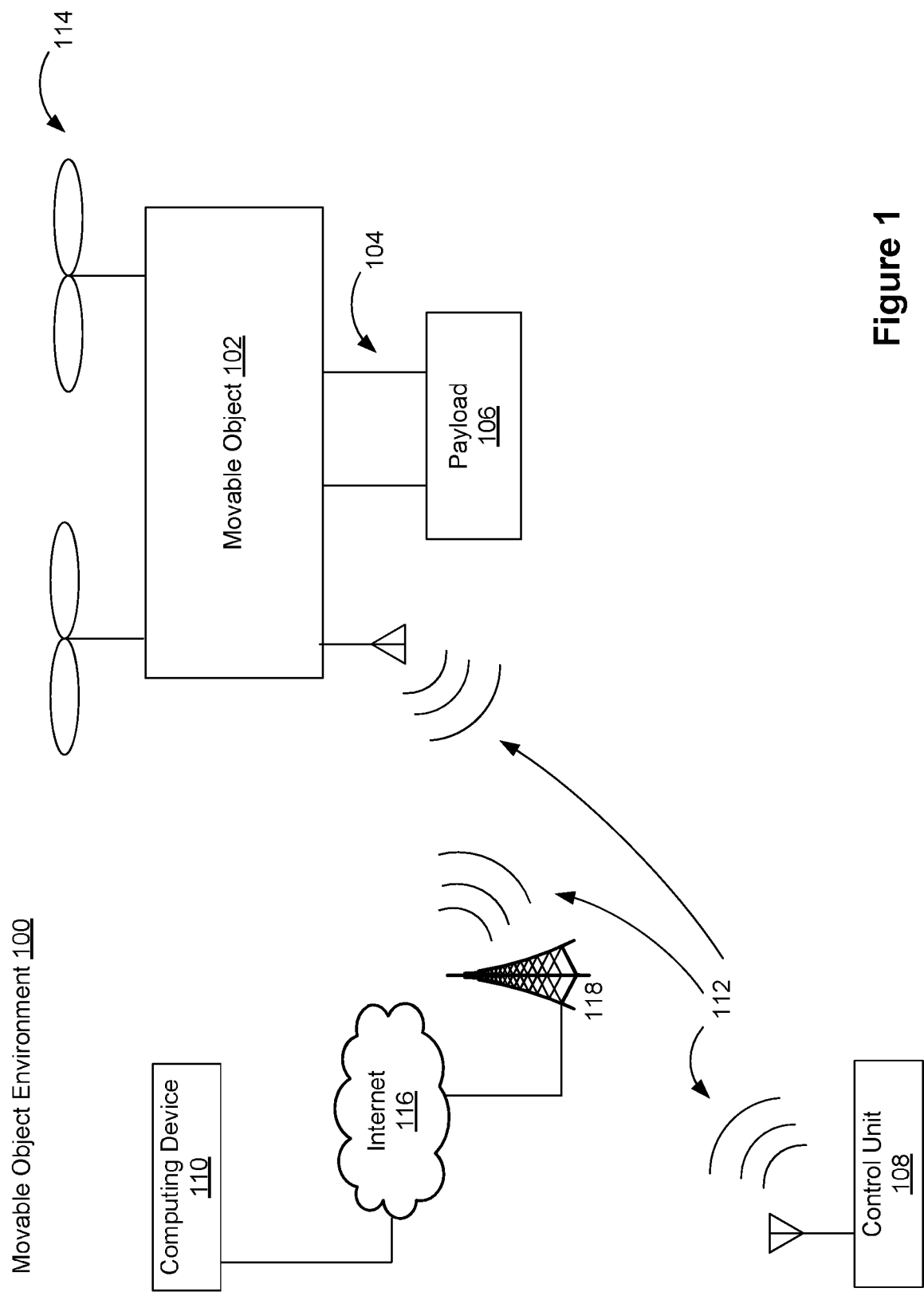
FIG. 1 illustrates a movable object environment, in accordance with some embodiments.

FIG. 1 illustrates a movable object environment 100, in accordance with some embodiments. The movable object environment 100 includes a movable object 102. In some embodiments, the movable object 102 includes a carrier 104 and/or a payload 106.

In some embodiments, the carrier 104 is used to couple the payload 106 to the movable object 102. In some embodiments, the carrier 104 includes an element (e.g., a gimbal and/or damping element) to isolate the payload 106 from movement of the movable object 102 and/or the movement mechanism 114. In some embodiments, the carrier 104 includes an element for controlling movement of the payload 106 relative to the movable object 102.

In some embodiments, the payload 106 is coupled (e.g., rigidly coupled) to the movable object 102 (e.g., coupled via carrier 104) such that the payload 106 remains substantially stationary relative to movable object 102. For example, the carrier 104 is coupled to the payload 106 such that the payload is not movable relative to the movable object 102. In some embodiments, the payload 106 is mounted directly to the movable object 102 without requiring the carrier 104. In some embodiments, the payload 106 is located partially or fully within the movable object 102.

In some embodiments, a control unit 108 communicates with the movable object 102, e.g., to provide control instructions to the movable object 102 and/or to display information received from the movable object 102 on a display (not shown) of the control unit 108. Although the control unit 108 is typically a portable (e.g., handheld) device, the control unit 108 need not be portable. In some embodiments, the control unit 108 is a dedicated control device (e.g., for the movable object 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the control unit 108 receives user input to control aspects of the movable object 102, the carrier 104, the payload 106, and/or a component thereof. Such aspects include, e.g., orientation, position, orientation, velocity, acceleration, navigation, and/or tracking. For example, a position of an input device of the control unit 108 (e.g., a position of a component of the input device) is manually set by a user to a position corresponding to an input (e.g., a predetermined input) for controlling the movable object 102. In some embodiments, the input device is manipulated by a user to input control instructions for controlling the navigation of the movable object 102. In some embodiments, an input device of control unit 108 is used to input a flight mode for the movable object 102, such as auto pilot or navigation according to a predetermined navigation path.

In some embodiments, the display (not shown) of the control unit 108 displays information generated by the movable object sensing system 210, the memory 204, and/or another system of the movable object 102. For example, the display displays information about the movable object 102, the carrier 104, and/or the payload 106, such as position, orientation, orientation, movement characteristics of the movable object 102, and/or distance between the movable object 102 and another object (e.g., a target and/or an obstacle). In some embodiments, information displayed by the display of control unit 108 includes images captured by an imaging device 216 (FIG. 2A), tracking data (e.g., a graphical tracking indicator applied to a representation of a target), and/or indications of control data transmitted to the movable object 102. In some embodiments, information displayed by the display of the control unit 108 is displayed in substantially real-time as information is received from the movable object 102 and/or as image data is acquired. In some embodiments, the display of the control unit 108 is a touchscreen display.

In some embodiments, the movable object environment 100 includes a computing device 110. The computing device 110 is, e.g., a server computer, a cloud server, a desktop computer, a laptop computer, a tablet, or another portable electronic device (e.g., a mobile telephone). In some embodiments, the computing device 110 is a base station that communicates (e.g., wirelessly) with the movable object 102 and/or the control unit 108. In some embodiments, the computing device 110 provides data storage, data retrieval, and/or data processing operations, e.g., to reduce the processing power and/or data storage requirements of the movable object 102 and/or the control unit 108. For example, the computing device 110 is communicatively connected to a database and/or the computing device 110 includes a database. In some embodiments, the computing device 110 is used in lieu of or in addition to the control unit 108 to perform any of the operations described with regard to the control unit 108.

In some embodiments, the movable object 102 communicates with a control unit 108 and/or a computing device 110, e.g., via wireless communications 112. In some embodiments, the movable object 102 receives information from the control unit 108 and/or the computing device 110. For example, information received by the movable object 102 includes, e.g., control instructions for controlling movable object 102. In some embodiments, the movable object 102 transmits information to the control unit 108 and/or the computing device 110. For example, information transmitted by the movable object 102 includes, e.g., images and/or video captured by the movable object 102.

In some embodiments, communications between the computing device 110, the control unit 108 and/or the movable object 102 are transmitted via a network (e.g., Internet 116)

and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the control unit 108 and/or the movable object 102 include control instructions. Control instructions include, e.g., navigation instructions for controlling navigational parameters of the movable object 102 such as position, orientation, orientation, and/or one or more movement characteristics of the movable object 102, the carrier 104, and/or the payload 106. In some embodiments, control instructions include instructions directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable object 102. In some embodiments, control instructions adjust movement of the carrier 104 relative to the movable object 102 with up to six degrees of freedom.

In some embodiments, control instructions are used to adjust one or more operational parameters for the payload 106. For example, control instructions include instructions for adjusting an optical parameter (e.g., an optical parameter of the imaging device 216). In some embodiments, control instructions include instructions for adjusting imaging properties and/or image device functions, such as capturing an image, initiating/ceasing video capture, powering an imaging device 216 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 216.

In some embodiments, when control instructions are received by movable object 102, the control instructions change parameters of and/or are stored by memory 204 (FIG. 2A) of movable object 102.

Figure 2A:
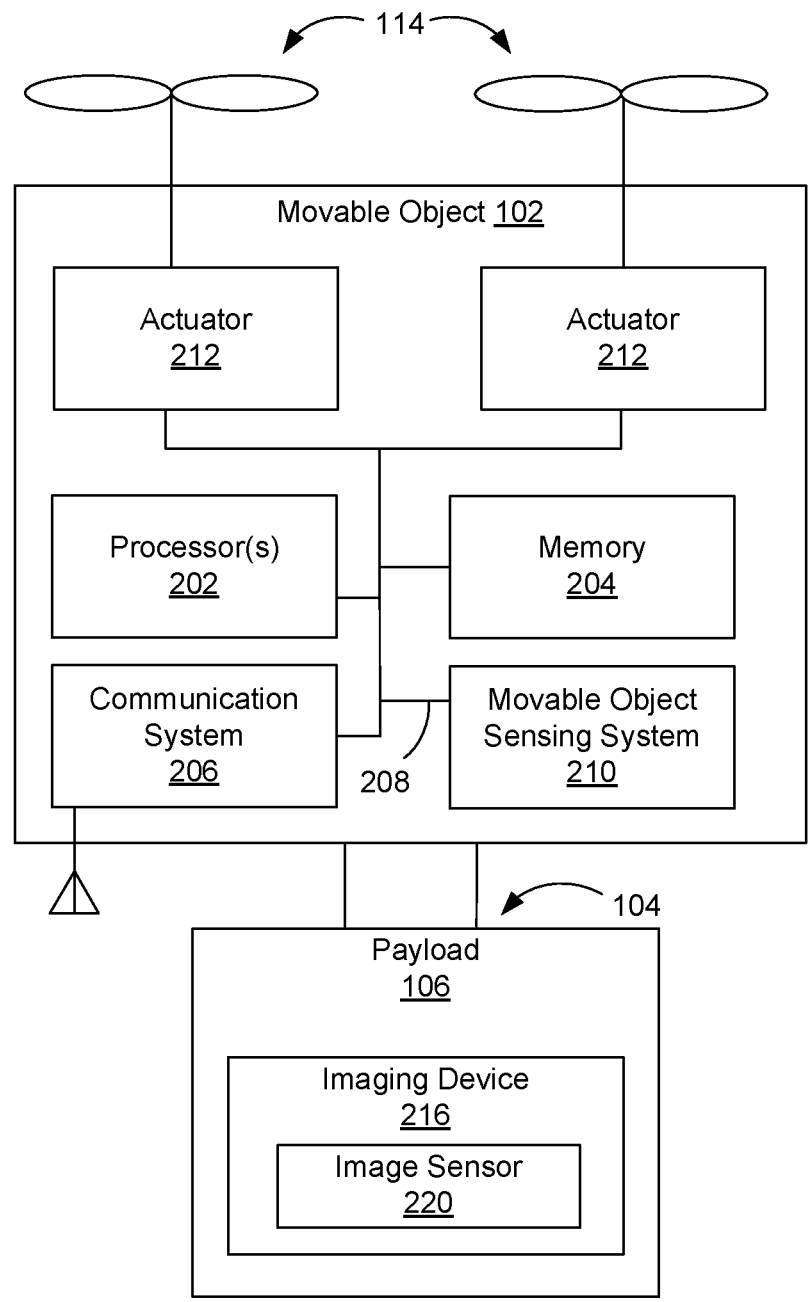
FIG. 2A illustrates a movable object, in accordance with some embodiments.

FIG. 2A illustrates an exemplary movable object 102, in accordance with some embodiments. The movable object 102 typically includes one or more processor(s) 202, a memory 204, a communication system 206, a movable object sensing system 210, and one or more communication buses 208 for interconnecting these components.

In some embodiments, the movable object 102 is a UAV and includes components to enable flight and/or flight control. In some embodiments, the movable object 102 includes communication system 206 with one or more network or other communications interfaces (e.g., via which flight control instructions are received), one or more movement mechanisms 114, and/or one or more movable object actuators 212 (e.g., to cause movement of movement mechanisms 114 in response to received control instructions). Although the movable object 102 is depicted as an aircraft, this depiction is not intended to be limiting, and any suitable type of movable object can be used. Actuator 212 is, e.g., a motor, such as a hydraulic, pneumatic, electric, thermal, magnetic, and/or mechanical motor.

In some embodiments, the movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to the movable object 102 at, e.g., the top, bottom, front, back, and/or sides. In some embodiments, the movement mechanisms 114 of a single movable object 102 include multiple movement mechanisms of the same type. In some embodiments, the movement mechanisms 114 of a single movable object 102 include multiple movement mechanisms with different movement mechanism types. The movement mechanisms 114 are coupled to the movable object 102 using any suitable means, such as support elements (e.g., drive shafts) and/or other actuating elements (e.g., the movable object actuators 212). For example, a movable object actuator 212 receives control signals from the processor(s) 202 (e.g., via the control bus 208) that activates the movable object actuator 212 to cause movement of a movement mechanism 114. For example, the processor(s) 202 include an electronic speed controller that provides control signals to a movable object actuator 212.

In some embodiments, the movement mechanisms 114 enable the movable object 102 to take off vertically from a surface or land vertically on a surface without requiring any horizontal movement of the movable object 102 (e.g., without traveling down a runway). In some embodiments, the movement mechanisms 114 are operable to permit the movable object 102 to hover in the air at a specified position and/or orientation. In some embodiments, one or more of the movement mechanisms 114 are controllable independently of one or more of the other movement mechanisms 114. For example, when the movable object 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable object 102. The multiple rotors are actuated to provide, e.g., vertical takeoff, vertical landing, and hovering capabilities to the movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable object 102 (e.g., with respect to up to three degrees of translation and/or up to three degrees of rotation).

In some embodiments, the memory 204 stores one or more instructions, programs (e.g., sets of instructions), modules, controlling systems and/or data structures, collectively referred to as "elements" herein. One or more elements described with regard to the memory 204 are optionally stored by the control unit 108, the computing device 110, and/or another device. In some embodiments, imaging device 216 includes memory that stores one or more parameters described with regard to the memory 204.

In some embodiments, the memory 204 stores a controlling system configuration that includes one or more system settings (e.g., as configured by a manufacturer, administrator, and/or user). For example, identifying information for the movable object 102 is stored as a system setting of the system configuration. In some embodiments, the controlling system configuration includes a configuration for the imaging device 216. The configuration for the imaging device 216 stores parameters such as position, zoom level and/or focus parameters (e.g., amount of focus, selecting autofocus or manual focus, and/or adjusting an autofocus target in an image). Imaging property parameters stored by the imaging device configuration include, e.g., image resolution, image size (e.g., image width and/or height), aspect ratio, pixel count, quality, focus distance, depth of field, exposure time, shutter speed, and/or white balance. In some embodiments, parameters stored by the imaging device configuration are updated in response to control instructions (e.g., generated by processor(s) 202 and/or received by the movable object 102 from control unit 108 and/or the computing device 110). In some embodiments, parameters stored by the imaging device configuration are updated in response to information received from the movable object sensing system 210 and/or the imaging device 216.

In some embodiments, a controlling system performs imaging device adjustment. The imaging device adjustment module stores, e.g., instructions for adjusting a distance between an image sensor and an optical device of an imaging device 216, e.g., instructions for controlling an imaging device actuator. In some embodiments, one or more instructions for performing imaging device adjustment are stored in the memory 204.

In some embodiments, the controlling system performs an autofocus operation. For example, the autofocus operation is performed, e.g., periodically, when a device determines from image analysis that a focus level has fallen below a focus level threshold, in response a determination that movable object 102 and/or an image subject (e.g., a target or a remote object) has moved by more than a threshold distance, and/or in response to user input. In some embodiments, user input (e.g., received at control unit 108 and/or computing device 110) initiates and/or adjusts an autofocus mode. In some embodiments, user input indicates one or more regions (e.g., in an image captured by imaging device 216, such as an image displayed by control unit 108 and/or computing device 110) to be used and/or prioritized for an autofocus operation. In some embodiments, the autofocus module generates control instructions for moving an optical device relative to an image sensor in accordance with an image distance value determined by an image distance determination module. In some embodiments, one or more instructions for performing an autofocus operation are stored in the memory 204.

In some embodiments, the controlling system performs image distance determination, e.g., to determine an object distance and/or an image distance in accordance with the operations described herein. For example, the image distance determination module uses sensor data from one or more depth sensors and one or more orientation sensors of a movable object to determine an image distance and generate a control instruction for moving an optical device relative to an image sensor in accordance with the determined image distance. In some embodiments, one or more instructions for performing image distance determination are stored in the memory 204.

The above identified controlling system, modules, and/or programs (e.g., sets of instructions) need not be implemented as separate software programs, procedures or modules, and thus various subsets of these modules may be combined or otherwise re-arranged in various embodiments, and stored in the memory 204. In some embodiments, the controlling system includes a subset of the modules and data structures identified above. Furthermore, the memory 204 may store additional modules and data structures not described above. In some embodiments, the programs, modules, and data structures stored in the memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more processors 202 of the movable object 102. In some embodiments, one or more of the above identified modules are stored on one or more storage devices of a device remote from the movable object (such as memory of the control unit 108, the computing device 110, and/or the imaging device 216) and/or executed by one or more processors of a device remote from the movable object 102 (such as processor(s) of the control unit 108, the computing device 110, and/or the imaging device 216).

The communication system 206 enables communication with the control unit 108 and/or the computing device 110, e.g., via wireless signals 112. The communication system 206 includes, e.g., transmitters, receivers, and/or transceivers for wireless communication. In some embodiments, the communication is one-way communication, such that data is only received by the movable object 102 from the control unit 108 and/or the computing device 110, or vice-versa. In some embodiments, communication is two-way communication, such that data is transmitted in both directions between the movable object 102 and the control unit 108 and/or the computing device 110. In some embodiments, the movable object 102, the control unit 108, and/or the computing device 110 are connected to the Internet 116 or other telecommunications network, e.g., such that data generated by the movable object 102, the control unit 108, and/or the computing device 110 is transmitted to a server for data storage and/or data retrieval (e.g., for display by a website).

Figure 3:
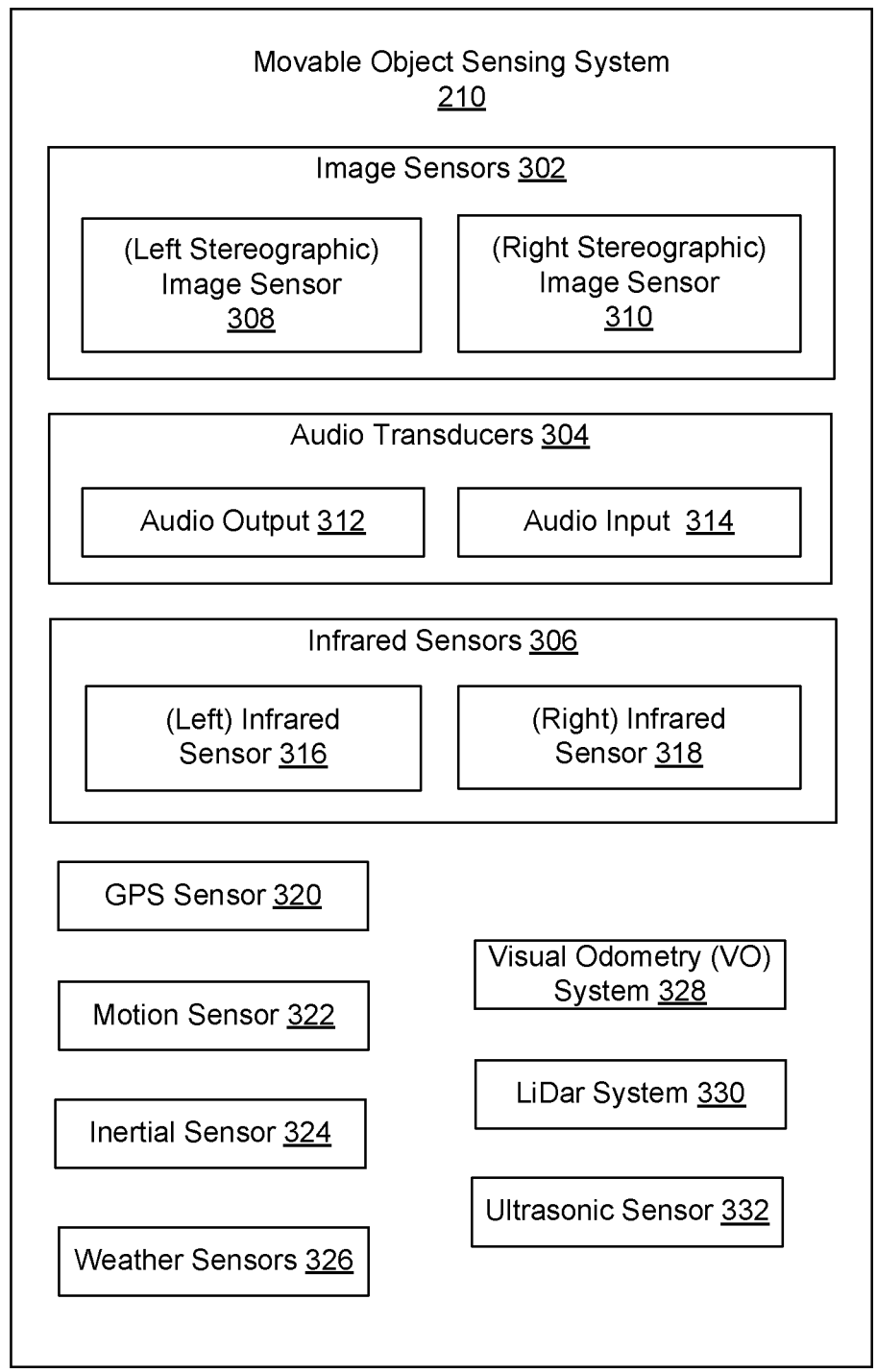
FIG. 3 illustrates an exemplary sensing system of a movable object, in accordance with some embodiments.

In some embodiments, the sensing system 210 of the movable object 102 includes one or more sensors, as described further with reference to FIG. 3. In some embodiments, movable object 102 and/or control unit 104 use sensing data generated by sensors of sensing system 122 to determine information such as a position of movable object 102, an orientation of movable object 102, movement characteristics of movable object 102 (e.g., angular velocity, angular acceleration, translational velocity, translational acceleration and/or direction of motion along one or more axes), proximity of movable object 102 to potential obstacles, weather conditions, locations of geographical features and/or locations of manmade structures.

Figure 2B:
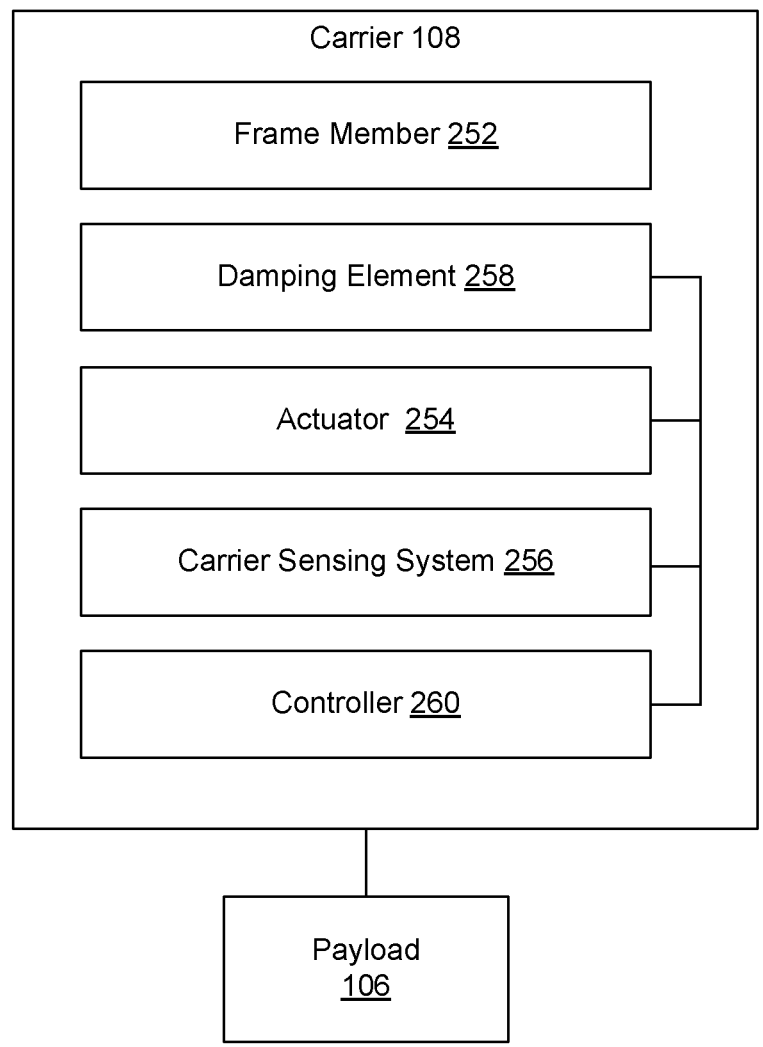
FIG. 2B illustrates an exemplary carrier in a target tracking system, in accordance with embodiments.
Figure 2B:
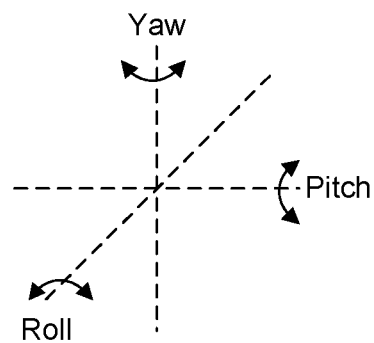

FIG. 2B illustrates an exemplary carrier 108 in a target tracking system 100, in accordance with embodiments. In some embodiments, carrier 108 couples a payload 106 to a movable object 102.

In some embodiments, carrier 108 includes a frame assembly including one or more frame members 252. In some embodiments, frame member 252 is coupled with movable object 102 and payload 106. In some embodiments, frame member 252 supports payload 106.

In some embodiments, carrier 108 includes one or more mechanisms, such as one or more actuators 254, to cause movement of carrier 108 and/or payload 106. Actuator 254 is, e.g., a motor, such as a hydraulic, pneumatic, electric, thermal, magnetic, and/or mechanical motor. In some embodiments, actuator 254 causes movement of frame member 252. In some embodiments, actuator 254 rotates payload 106 about one or more axes, such as three axes: X axis ("pitch axis"), Z axis ("roll axis"), and Y axis ("yaw axis"), relative to movable object 102. In some embodiments, actuator 254 translates payload 106 along one or more axes relative to movable object 102.

In some embodiments, carrier 108 includes one or more carrier sensing system 256, e.g., for determining a state of carrier 108 or payload 106. Carrier sensing system 256 includes, e.g., motion sensors (e.g., accelerometers), rotation sensors (e.g., gyroscopes), potentiometers, and/or inertial sensors. In some embodiments, carrier sensing system 256 includes one or more sensors of movable object sensing system 210 as described below with regard to FIG. 3. Sensor data determined by carrier sensing system 256 includes, e.g., spatial disposition (e.g., position, orientation, or attitude) and/or movement information such as velocity (e.g., linear or angular velocity) and/or acceleration (e.g., linear or angular acceleration) of carrier 108 and/or payload 106. In some embodiments, sensing data and/or state information calculated from the sensing data are used as feedback data to control the movement of one or more components (e.g., frame member 252, actuator 254, and/or damping element 258) of carrier 108. Carrier sensor 206 is coupled to, e.g., frame member 252, actuator 254, damping element 258, and/or payload 106. In an embodiment, a carrier sensor 256 (e.g., a potentiometer) measures movement of actuator 254 (e.g., the relative positions of a motor rotor and a motor stator) and generates a position signal representative of the movement of the actuator 254 (e.g., a position signal representative of relative positions of the motor rotor and the motor stator). In some embodiments, data generated by a carrier sensor 256 is received by processor(s) 116 and/or memory 204 of movable object 102.

In some embodiments, the coupling of carrier 108 to movable object 102 includes one or more damping elements 258. Damping elements 258 are configured to reduce or eliminate movement of the load (e.g., payload 106 and/or carrier 108) caused by movement of movable object 102. Damping elements 258 include, e.g., active damping elements, passive damping elements, and/or hybrid damping elements having both active and passive damping characteristics. The motion damped by the damping elements 258 can include one or more of vibrations, oscillations, shaking, or impacts. Such motions may originate from motions of movable object that are transmitted to the load. For example, the motion may include vibrations caused by the operation of a propulsion system and/or other components of a movable object 101.

In some embodiments, a damping element 258 provides motion damping by isolating the load from the source of unwanted motion by dissipating or reducing the amount of motion transmitted to the load (e.g., vibration isolation). In some embodiments, damping element 258 reduces the magnitude (e.g., amplitude) of the motion that would otherwise be experienced by the load. In some embodiments the motion damping applied by a damping element 258 is used to stabilize the load, thereby improving the quality of images captured by the load (e.g., image capturing device), as well as reducing the computational complexity of image stitching steps required to generate a panoramic image based on the captured images.

Damping element 258 described herein can be formed from any suitable material or combination of materials, including solid, liquid, or gaseous materials. The materials used for the damping elements may be compressible and/or deformable. For example, the damping element 258 is made of, e.g. sponge, foam, rubber, gel, and the like. For example, damping element 258 includes rubber balls that are substantially spherical in shape. The damping element 258 is, e.g., substantially spherical, rectangular, and/or cylindrical. In some embodiments, damping element 208 includes piezoelectric materials or shape memory materials. In some embodiments, damping elements 258 include one or more mechanical elements, such as springs, pistons, hydraulics, pneumatics, dashpots, shock absorbers, isolators, and the like. In some embodiments, properties of the damping element 258 are selected so as to provide a predetermined amount of motion damping. In some instances, the damping element 208 has viscoelastic properties. The properties of damping element 258 are, e.g., isotropic or anisotropic. In some embodiments, damping element 258 provides motion damping equally along all directions of motion. In some embodiments, damping element 258 provides motion damping only along a subset of the directions of motion (e.g., along a single direction of motion). For example, the damping element 258 may provide damping primarily along the Y (yaw) axis. In this manner, the illustrated damping element 258 reduces vertical motions.

In some embodiments, carrier 108 includes controller 260. Controller 260 includes, e.g., one or more controllers and/or processors. In some embodiments, controller 260 receives instructions from processor(s) 116 of movable object 102. For example, controller 260 is connected to processor(s) 202 via control bus 208. In some embodiments, controller 260 controls movement of actuator 254, adjusts one or more parameters of carrier sensor 256, receives data from carrier sensor 256, and/or transmits data to processor 202.

FIG. 3 illustrates an exemplary sensing system 210 of a movable object 102, in accordance with some embodiments. In some embodiments, one or more sensors of the movable object sensing system 210 are mounted to the exterior, located within, or otherwise coupled to the movable object 102. In some embodiments, one or more sensors of the movable object sensing system 210 are components of and/or coupled to the carrier 104 (e.g., FIG. 2B), the payload 106, and/or the imaging device 216. Where sensing operations are described herein as being performed by the movable object sensing system 210, it will be recognized that such operations are optionally performed by one or more sensors of the carrier 104, the payload 106, and/or the imaging device 216 in addition to and/or in lieu of one or more sensors of the movable object sensing system 210.

Movable object sensing system 210 generates static sensing data (e.g., a single image captured in response to a received instruction) and/or dynamic sensing data (e.g., a series of images captured at a periodic rate, such as a video).

In some embodiments, movable object sensing system 210 includes one or more image sensors 302, such as image sensor 308 (e.g., a left stereographic image sensor) and/or image sensor 310 (e.g., a right stereographic image sensor). Image sensors 302 capture, e.g., images, image streams (e.g., videos), stereographic images, and/or stereographic image streams (e.g., stereographic videos). Image sensors 302 detect light, such as visible light, infrared light, and/or ultraviolet light. In some embodiments, movable object sensing system 210 includes one or more optical devices (e.g., lenses) to focus or otherwise alter the light onto one or more image sensors 302. In some embodiments, image sensors 302 include, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors.

In some embodiments, movable object sensing system 210 includes one or more audio transducers 304. For example, an audio detection system includes audio output transducer 312 (e.g., a speaker), and audio input transducer 314 (e.g. a microphone, such as a parabolic microphone). In some embodiments, microphone and a speaker are used as components of a sonar system. In some embodiments, a sonar system is used to detect current location information of an object (e.g., an obstacle and/or a target) in the environment.

In some embodiments, movable object sensing system 210 includes one or more infrared sensors 306. In some embodiments, a distance measurement system includes a pair of infrared sensors, e.g., infrared sensor 316 (such as a left infrared sensor) and infrared sensor 318 (such as a right infrared sensor) or another sensor or sensor pair. The distance measurement system can be used to measure a distance to an object in the environment (e.g., a target and/or an obstacle).

In some embodiments, a system to produce a depth map includes one or more sensors or sensor pairs of movable object sensing system 210 (such as left stereographic image sensor 308 and right stereographic image sensor 310; audio output transducer 312 and audio input transducer 314; and/or left infrared sensor 316 and right infrared sensor 318. In some embodiments, a pair of sensors in a stereo data system (e.g., a stereographic imaging system) simultaneously captures data from different positions. In some embodiments, a depth map is generated by a stereo data system using the simultaneously captured data. In some embodiments, a depth map is used for positioning and/or detection operations, such as detecting an obstacle, detecting current location information of an obstacle, detecting a target, and/or detecting current location information for a target.

In some embodiments, movable object sensing system 210 further includes, but is not limited to, one or more global positioning system (GPS) sensors 320, motion sensors (e.g., accelerometers) 322, rotation sensors (e.g., gyroscopes), inertial sensors 324, proximity sensors (e.g., infrared sensors) and/or weather sensors 326 (e.g., pressure sensor, temperature sensor, moisture sensor, and/or wind sensor), visual odometry (VO) system 328, Lidar system 330, and ultrasonic sensor 332. In some embodiments, the movable object sensing system 210 includes an inertial measurement unit (IMU) that may include the motion sensors 322, the rotation sensors, and optionally magnetometers.

The VO system 328 can be used for estimating position, orientation, and/or motion of the movable object 102 based on visual data captured by one or more image sensors of the VO system 328. In some embodiments, the VO system 328 includes one or more pairs of image sensors, and each pair of image sensors includes left and right stereoscopic image sensors that can provide depth information. For example, the VO system 328 can include five pairs of image sensors respectively located at four sides of the body of the movable object 102 and the bottom of the movable object 102 (e.g., FIG. 6B). In another example, the VO system 328 includes only one pair of image sensors located at one side of the body of the movable object 102. In yet another example, the VO system 328 includes two pair of image sensors located at one side of the body of the movable object 102 and the bottom of the movable object 102. In some other embodiments, the visual odometry system 328 includes one or more single imaging sensors or one or more omnidirectional cameras.

In some embodiments, sensing data generated by one or more sensors of movable object sensing system 210 and/or information determined using sensing data from one or more sensors of movable object sensing system 210 are transmitted to control unit 108 (e.g., via communication system 206). In some embodiments, data generated one or more sensors of movable object sensing system 210 and/or information determined using sensing data from one or more sensors of movable object sensing system 122 is stored by memory 204.

Figure 4:
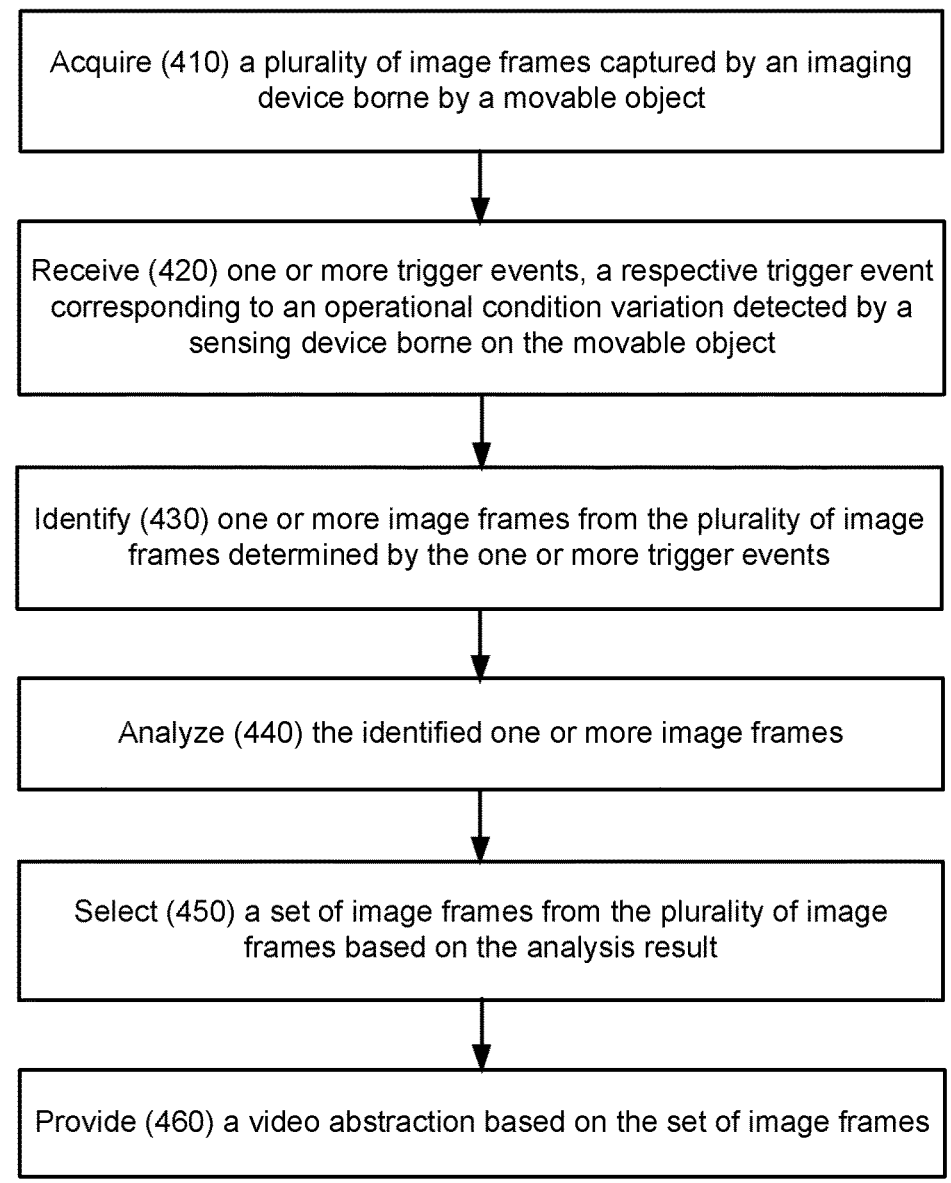
FIG. 4 is a diagram illustrating a method of processing image data captured by an imaging device borne on the movable object to create video abstraction, in accordance with some embodiments.

FIG. 4 is a diagram illustrating a method 400 of processing image data captured by an imaging device 216 borne on the movable object 102 to create video abstraction, in accordance with some embodiments. In some embodiments, method 400 is performed by an electronic device such as the computing device 110, the control unit 108, or the movable object 102 (FIG. 1). For example, method 400 is performed by a controller of the imaging device 216, the movable object 102, or the control unit 108. In some other embodiments, the method 300 is performed by other electronic device(s), such as a mobile device or a computing device paired with the control unit 108 for operating the movable object 102. Operations performed in FIG. 4 correspond to instructions stored in computer memories or other computer-readable storage mediums of the corresponding device(s). One or more steps of method 400 are further illustrated in FIGS. 5 and 6A-6B, which are discussed in combination with FIG. 4 in the present disclosure.

In some embodiments, the electronic device acquires (410) a plurality of image frames. The plurality of image frames are captured by the imaging device 216 borne on the movable object 102 when the movable object 102 moves along a path or hovers at a certain height. In some embodiments, the plurality of image frames are a series of image frames of a video captured at a periodic rate within a predefined time window.

Figure 5:
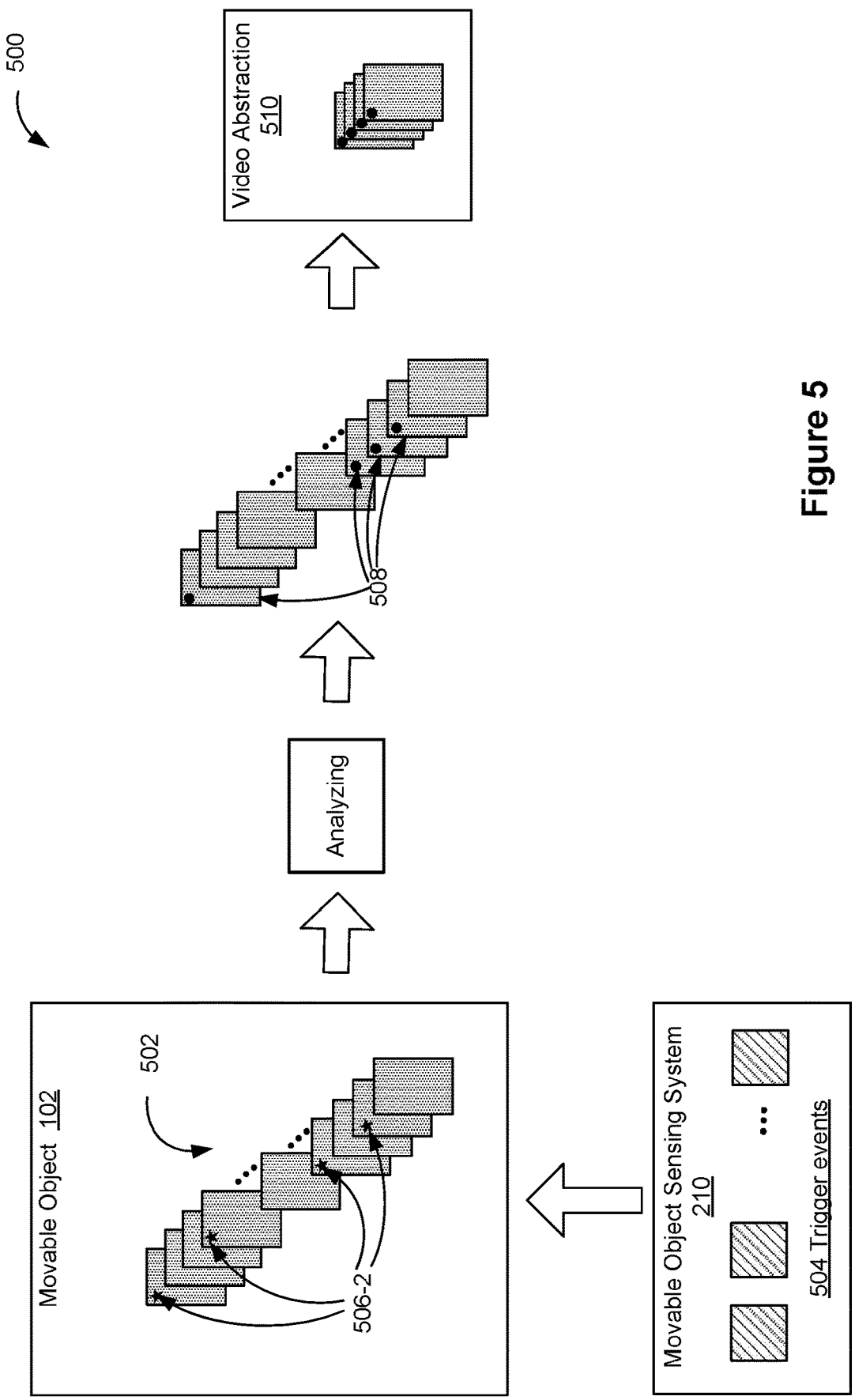
FIG. 5 illustrates an exemplary process of selecting a plurality of image frames for video abstraction, in accordance with some embodiments.

FIG. 5 illustrates an exemplary process 500 of selecting a plurality of image frames for video abstraction, in accordance with some embodiments. The imaging device 216 of the movable object 102 captures a plurality of image frames 502 in sequence at a predetermined frame rate.

Method 400 proceeds to receive (420) one or more trigger events 504 (FIG. 5). A respective trigger event corresponds to an operational condition variation detected by a sensing device of the movable object sensing system 210 borne on the movable object 102. In some embodiments, the one or more trigger events are detected by the movable object sensing system 210 as the movable object 102 acquires the plurality of image frames 502.

In some embodiments, the one or more trigger events 504 correspond to identifying one or more keyframes by the VO system 328 borne on the movable object 102. In some embodiments, a plurality of image frames are captured by one or more cameras of the VO system 328 (FIG. 3), and a keyframe is identified by the VO system 328 based on analysis of one or more features (e.g., one or more sets of pixels) in the plurality of image frames. An identified keyframe may correspond to a positional change of the movable object 102 and/or a change of an object in the environment. In some embodiments, the VO system 328 performs image correction (e.g., distortion removal) to the images acquired by the one or more cameras of the VO system 328. The VO system 328 then performs feature detection and extraction to the corrected images. For example, the VO system 328 matches features across frames and constructs an optical flow field. The VO system 328 identifies one or more keyframes based on feature changes and/or changes of the optical flows in the images. The VO system 328 can also identify the one or more keyframes using any other suitable technology. In some embodiments, when the VO system 328 identifies a keyframe, the VO system 328 sends a notification to the electronic device to mark a temporally correlated image frame captured by the imaging device 216. For example, the identified keyframe and the marked correlated image frame may have respective time stamps corresponding to the same time point. In some embodiments, the VO system 328 may analyze a plurality of image frames captured by the imaging device 216 to identify keyframes. For example, a plurality of image frames captured by the imaging device 216 can be analyzed using similar algorithms as discussed above to identify keyframes that correspond to the one or more trigger events.

In some embodiments, the one or more trigger events correspond to a positional change of the movable object 102 satisfying predetermined criteria. The positional change may be tracked by the inertial measurement unit (IMU) of the movable object 102. For example, a trigger event corresponds to an attitude change of the movable object 102 that is greater than a predetermined threshold. In another example, a trigger event corresponds to a velocity change of the movable object 102 that is greater than a predetermined threshold.

In some embodiments, the one or more trigger events correspond to a positional change of a carrier 108 (e.g., a gimbal) borne by the movable object 102 satisfying a predetermined criterion. The carrier 108 is configured to carry the imaging device 216. The positional change of the carrier 108 is measured by one or more sensors of the carrier sensing system 256. For example, a trigger event corresponds to a rotational angle of the gimbal that is greater than a predetermined threshold. In another example, a trigger event corresponds to a motion acceleration of the gimbal that is greater than a predetermined threshold.

In some embodiments, a trigger event corresponds to a timing attribute of an image frame captured by the imaging device 216 that satisfies predetermined criteria. For example, the imaging device 216 is pre-set to mark an image frame of interest periodically, such as once every 5 minutes, in addition to receiving the one or more trigger events from the movable object sensing system 210. In another example, when there are no trigger events for a predefined period of time (e.g., 5 minutes), an image frame captured by the imaging device 216 is identified as an image frame of interest.

Method 400 proceeds to identify (430) one or more image frames from the plurality of image frames captured by the imaging device 216 and determined by the one or more trigger events 504. In some embodiments, the electronic device marks the identified image frames as image frames of interest 506 (FIG. 5). In some embodiments, the image frames of interest 506 are temporally correlated with the trigger events 504. For example, an image frame of interest 506 and a temporally correlated trigger event 504 may have respective time stamps that correspond to the same time point.

In some embodiments, the electronic device compares attitude information of the imaging device 216 and attitude information of the VO system 328. In some embodiments, the attitude information of the imaging device 216 can be obtained from the carrier sensing system 256 of the carrier 108. The attitude information of the VO system 328 can be predetermined. For example, the orientation (e.g., Euler angles) of the imaging device 216 in 3-D space as shown in FIG. 2B is $(\Theta, \Phi, \Psi)$. The orientation of one camera (e.g., camera i of N cameras) of the VO system 328 is $(\theta_i, \phi_i, \psi_i)$. The corresponding orientation angles may be compared. If the difference between the orientation angles is less than a predetermined threshold value, the imaging device 216 and the VO system 328 are determined to be pointing at approximately the same (or similar) direction. If the difference between the orientation angles is equal to or greater than the predetermined threshold value, the imaging device 216 and the VO system 328 are determined to be pointing at different directions. In one example, the attitude of the imaging device 216 and the attitude of the VO system 328 may be compared by equation (1):

$$\min_i \max(\mathrm{abs}(\theta i - \Theta), \mathrm{abs}(\phi i - \Phi), \mathrm{abs}(\psi i - \Psi)) < T \qquad (1)$$

where the threshold value T is 45 degrees.

In some embodiments, the imaging device 216 and one or more cameras of the VO system 328 may point at the same direction, or a difference between the attitude information of the imaging device 216 and the attitude information of one or more cameras of the VO system 328 may be within a predetermined threshold. The electronic device identifies the plurality of image frames of interest 506 that are temporally related to the keyframe identified by the VO system 328.

In some embodiments, the imaging device 216 and one or more cameras of the VO system 328 may point at different direction, or a difference between the attitude information of the imaging device 216 and the attitude information of one or more cameras of the VO system 328 may be greater the predetermined threshold value. For example, only one side of the body of the movable object 102 is mounted with a camera or a pair of cameras of the VO system 328, and the imaging device 216 may point to a different side from the side which has the VO camera(s). The electronic device identifies the plurality of image frames of interest 506 using a model for selecting image frames of interest. For example, the model may be used for predicting timing for an image frame of interest 506 to occur.

In some embodiments, the model for predicting timing of an image frame of interest 506 is trained (and tested) using historical data related to selection of the image frames of interest. The historical data may include time stamps of previously identified image frames of interest and characteristics of one or more trigger events associated with the previously identified image frames of interest respectively. In some embodiments, the one or more trigger events are selected from the group consisting of (1) image content change of image frames captured by the imaging device 216, (2) previously identified keyframes by the VO system 328, and (3) state change of the movable object 102. The image content change of interest frames may include a drastic brightness change. The state change of the movable object 102 may include a change from a static state to a linear flight motion. In some embodiments, the training data includes attribute information, orientation, speed, acceleration of the carrier 108 and/or the movable object 102. Thus the model can predict when or under what type of circumstance an image frame of interest is selected. In some embodiments, the model can be trained and used online as the movable object 102 moves and captures images/videos. In some embodiments, the model can be trained off-line using a separate system. In some embodiments, the model may include neural network models such as convolutional neural network (CNN).

Figure 6A:
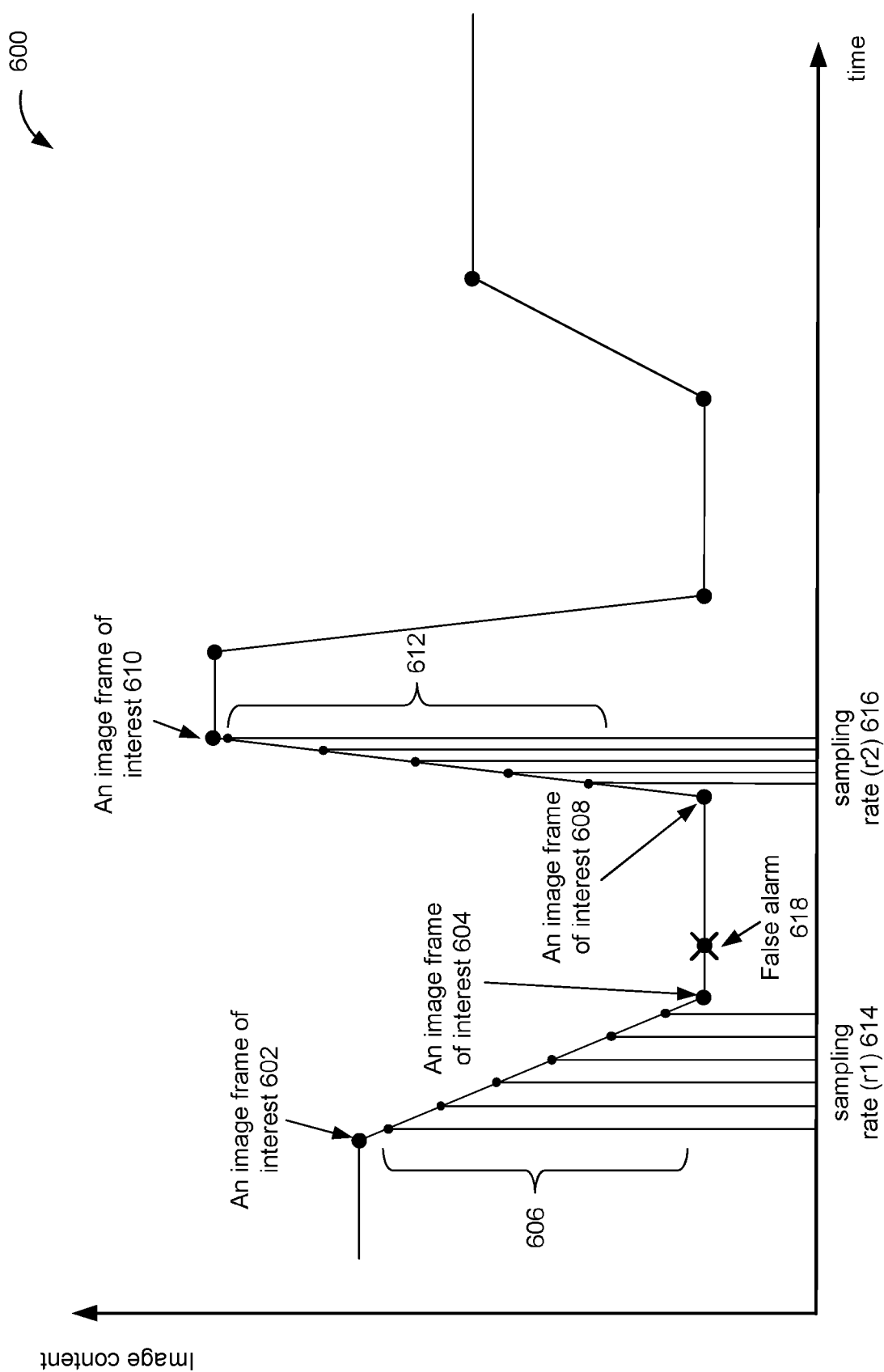
FIG. 6A illustrates a diagram for analyzing the identified image frames of interest to select image frames for video abstraction, in accordance with some embodiments.

Method 400 proceeds to analyze (440) the identified image frames of interest 506. The electronic device then selects (450) a set of image frames 508 from the plurality of image frames captured by the imaging device 216 based on the analysis result. FIG. 6A illustrates a diagram 600 for analyzing the identified image frames of interest 506 to select image frames 508 for video abstraction, in accordance with some embodiments. Diagram 600 includes image content information and time stamp of each image frame captured by the imaging device 216. In some embodiments, the image content information includes, but is not limited to, brightness, focal length, optical flow vectors, pixel intensity, and extracted features of each image frame.

In some embodiments, the electronic device compares the image content of a pair of consecutive image frames from the identified plurality of image frames of interest 506. The pair of consecutive image frames includes a first image frame 602 and a second image frame 604 subsequent to the first image frame 602. The first image frame 602 and the second image frame 604 correspond to two temporally consecutive trigger events respectively. In some embodiments, it is determined that a difference in image content between the first image frame 602 and the second image frame 604 is greater than a predetermined threshold. In some embodiments, the difference in image content between two image frames can be measured using many known image similarity comparison algorithms including, but not limited to, cross-correlation, mutual information, sum of squared intensity differences, ratio image uniformity, etc. Among these algorithms, mutual information and normalized mutual information are image similarity measures commonly used for registration of multimodality images while cross-correlation, sum of squared intensity differences and ratio image uniformity are commonly used for registration of images in the same modality.

In some embodiments, the difference in image content between two image frames include difference of a set of optical flow vectors in the first image frame 602 and the second image frame 604. In some embodiments, the difference in image content between two image frames include pixel data difference, brightness difference, parameter difference of the imaging device 216, positional difference of the imaging device 216 and/or of the movable object 102, and/or environment data difference. In some embodiments, in accordance with a determination that a difference in image content between the first image frame 602 and the second image frame 604 is greater than a predetermined threshold, the electronic device selects a group of image frames 606 captured between the first image frame 602 and the second image frame 604 from the sequence of image frames captured by the imaging device 216. The group of image frames 606 are included in the set of image frames for the video abstraction.

In some embodiments, the electronic device further determines a sampling rate for selecting the group of image frames 606 between two consecutive image frames of interest. In some embodiments, the electronic device determines an image content change rate between two consecutive image frames of interest. The electronic device then selects a sampling rate in accordance with the image content change rate. In some embodiments, the content change rate is a ratio between the content change values (e.g., brightness difference, optical flow vector difference, etc.) and time difference between the two image frames of interest. For example as shown in FIG. 6A, the content change rate between the image frame 602 and the image frame 604 is smaller than the content change rate between the image frame 608 and the image frame 610. Accordingly, a sampling rate (r1) 614 for selecting the group of image frames 606 between the image frame 602 and the image frame 604 is determined to be smaller than a sampling rate (r2) 616 for selecting the group of image frames 612 between the image frame 608 and the image frame 610. That is, more image frames within a certain time unit are selected for the group of image frames 612 in comparison with the group of image frames 606.

In some embodiments, the electronic device also identifies false alarms from the plurality of image frames of interest 506 such that the false alarms are not included in the video abstraction. The false alarms include, but are not limited to, image frames of interest 506 that do not include information of interest to be included in the video abstraction. For example, the false alarms may include duplicate image frames with identical or similar image content as one or more image frames included in the video abstraction. The electronic device verifies the identified plurality of image frames of interest 506 by comparing image content of a plurality of consecutive image frames from the identified plurality of image frames of interest 506. In accordance with a determination that the plurality of consecutive image frames have differences in image content that are equal to or below a predetermined threshold, the electronic device excludes one or more image frames of interest from the plurality of consecutive image frames from the set of image frames to be considered in the video abstraction.

For example, the electronic device compares image content of an image frame of interest 618, a preceding image frame of interest 604, and a following image frame of interest 608 that are selected from the identified plurality of image frames of interest 506. In accordance with a determination that a first difference between the image frame of interest 618 and the preceding image frame of interest 604, and a second difference between the image frame of interest 618 and the following image frame of interest 608 are equal (e.g., FIG. 6A) or are below a predetermined threshold, the electronic device identifies the image frame of interest 618 as a false alarm. The electronic device excludes the image frame of interest 618 from being selected to be included in the video abstraction.

Figure 6B:
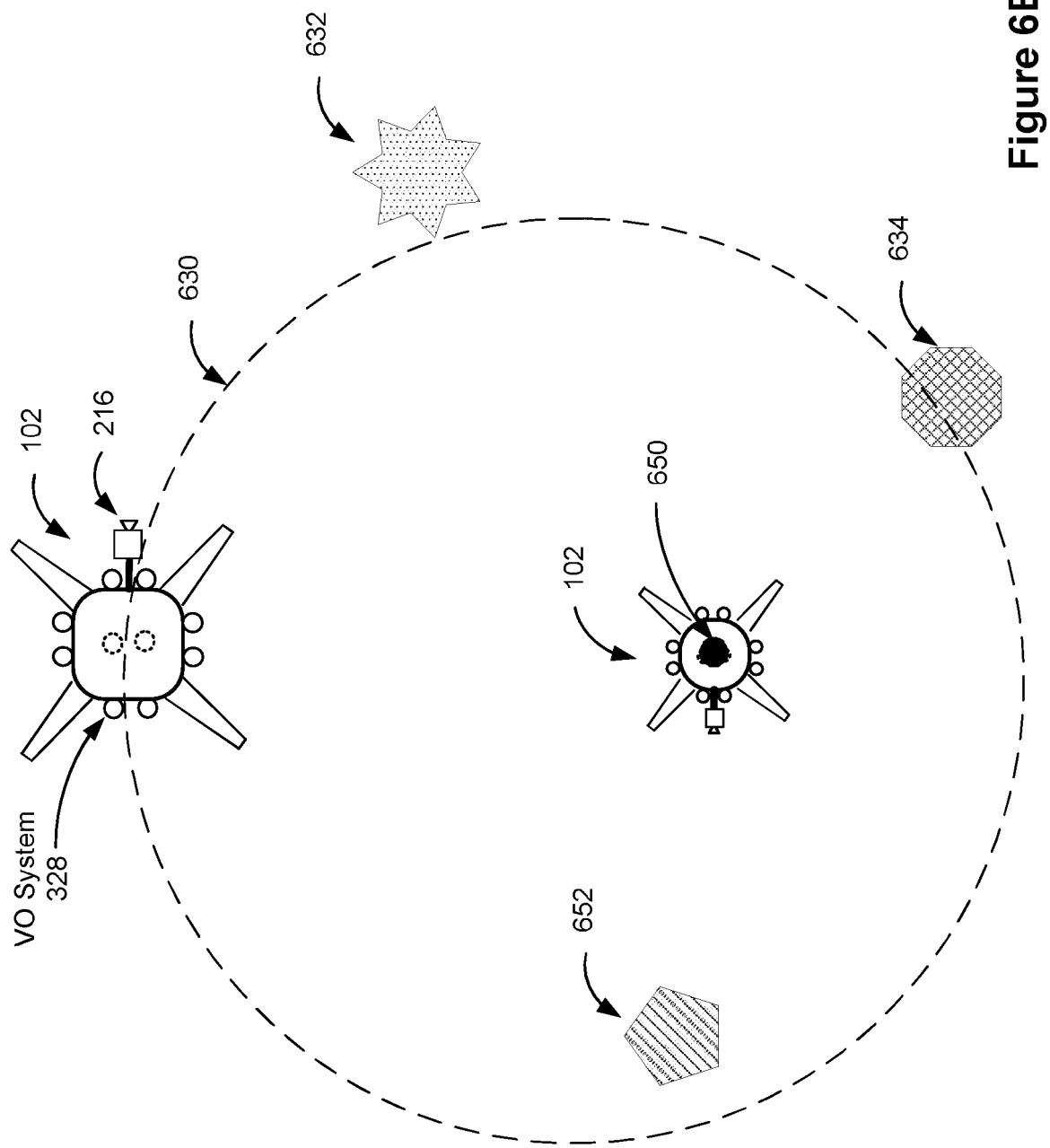
FIG. 6B illustrates exemplary embodiments for adding or reducing image frames for video abstraction, in accordance with some embodiments.
Figure 7E:
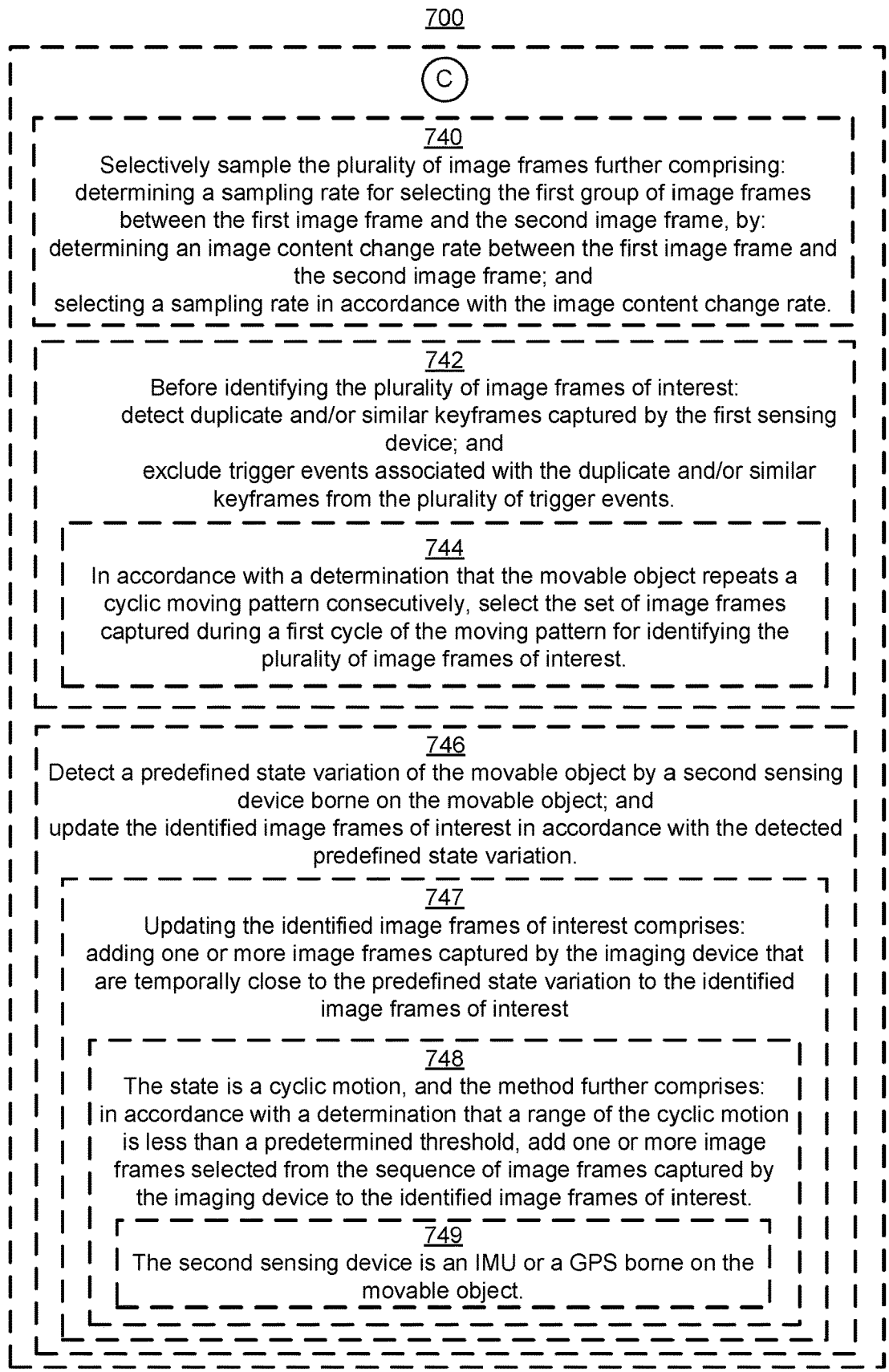

FIG. 6B illustrates exemplary embodiments for updating (e.g., adding or reducing) image frames for video abstraction, in accordance with some embodiments. In some embodiments, before identifying (430) the plurality of image frames of interest 506, the electronic device detects duplicate and/or similar keyframes captured by a certain sensing device of the movable object sensing system 210. For example, the electronic device detects duplicate and/or similar keyframes captured by the VO system 328 using a different sensing device, e.g., the IMU of the movable object sensing system 210. The electronic device excludes trigger events associated with the detected duplicate and/or similar keyframes from the one or more trigger events detected by that sensing device.

For example as shown in FIG. 6B, the movable object 102 moves in a cyclic moving pattern consecutively, such as a circular motion 630. One or more trigger events 504 may be detected during the motion of the movable object 102, such as a trigger event 632 (e.g., a static object in the environment that enters the view of the imaging device 216) and a trigger event 634 (e.g., rotation of the imaging device 216). If only the VO system 328 is used for detecting the one or more trigger events 504, the VO system 328 may repeatedly record the trigger events 632 and 634 in every circle. In this case, duplicate and/or similar keyframes may be received to be associated with the trigger events 632 and 634 for every circle. Furthermore, based on the information retrieved from the VO system 328 alone, it is difficult to determine whether there is duplicate or similar information being obtained in every cycle of the moving pattern. In order to avoid receiving duplicate or similar image frames of interest, a different sensing device, such as the IMU and/or GPS of the movable object 102, may be used for determining whether the movable object 102 is moving in a cyclic moving pattern consecutively. Based on the IMU data, the electronic device may determine that the movable object 102 is moving in a cyclic moving pattern consecutively, e.g., along the circular motion 630. The electronic device then selects the set of image frames captured during a first cycle of the circular motion 630 for identifying the plurality of image frames of interest. Image frames captured from the other circles are excluded from being selected as the image frames of interest.

In some embodiments, the electronic device also detects whether additional keyframes are needed in addition to the keyframes captured by a certain sensing device of the movable object sensing system 210. In one example, the movable object 102 may statically hover and rotate to take images/videos of the surrounding environment at a certain point 650. The VO system 328 may be used for locking the static-hover location to avoid drifting of the movable object 102. In order to do so, the VO system 328 captures only one keyframe every circle. For example, the VO system 328 captures a keyframe associated with the trigger event 632 (e.g., the static object in the environment) to make sure that the movable object 102 hovers and rotates at the point 650. In this case, only the image frame associated with the keyframe of the trigger event 632 will be identified, and other potential image frames of interest may be lost from the video abstraction. In another example, if only the VO system 328 is used for tracking trigger events, different types of trigger events may be missed or delayed in detection by the VO system 328. For example, a trigger event 652 that is associated with a temperature rise may be missed or delayed in detection by the VO system 328. In this case, one or more potential image frames of interest may be missed.

Therefore, it is helpful to take data from another sensing device, such as the IMU and/or a temperature sensor of the movable object sensing system 210, in combination with the data received from the VO system 328. In some embodiments, one or more state variations of the movable object 102 may be predefined. The predefined state variations may include a state of statically hovering and rotating, and/or a temperature variation surrounding the movable object 102. A sensing device different from the VO system 328 is used for detecting a predefined state variation of the movable object 102. The sensing device may include the IMU or the temperature sensor borne on the movable object 102. When a predefined state variation is detected, the electronic device adds one or more image frames captured by the imaging device 216 that are temporally close to the detected predefined state variation to the image frames of interest 506.

In one example, after the IMU detects the movable object 102 is statically hovering and rotating at the point 650, the carrier sensing system 256 may be used for detecting attitude change of the imaging device 216 which is associated with the trigger event 634. The electronic device then adds one or more image frames captured by the imaging device 216 near the trigger event 634 as image frames of interest, in addition to the image frames of interest associated with one or more keyframes of the trigger event 632 detect by the VO system 328.

In another example, after the temperature sensor detects the trigger event 652 associated with a temperature rise, the electronic device adds one or more image frames captured by the imaging device 216 near the trigger event 652 as image frames of interest, in addition to the image frames of interest associated with one or more keyframes of the trigger event 632 detect by the VO system 328.

In some embodiments, the adding or reducing image frames discussed with reference to FIG. 6B can be performed prior to identifying the plurality of image frames of interest 506. For example, before identifying the plurality of image frames of interest, the electronic device detects the duplicate keyframes to exclude trigger events associated with the duplicate keyframes from the one or more trigger events. In another example, before identifying the plurality of image frames of interest, the electronic device receives other types of trigger events, which are based on data received from a first sensing device (e.g., the IMU) but are missed by a second sensing device (e.g., the VO system). The electronic device then adds the one or more trigger events detected by the first sensing device, in addition to trigger events detected by the second sensing device. The plurality of image frames of interest 506 are then identified based on the added and/or reduced trigger events.

In some embodiments, the adding or reducing image frames discussed with reference to FIG. 6B can be performed after identifying the plurality of image frames of interest 506. For example, the electronic device adds or reduces interest frames of interest that are selected from the image frames captured by the imaging device 216 based on the added and/or reduced trigger events. In some embodiments, the adding or reducing image frames discussed with reference to FIG. 6B can be performed in real time as the electronic device identifies one or more image frames of interest 506 from the images/videos captured by the imaging device 216.

Referring back to FIG. 4, method 400 proceeds to provide (460) a video abstraction 510 (FIG. 5) based on the set of image frames 508 selected from the plurality of image frames. The electronic device may provide the video abstraction 510 to a display (e.g., a display of the control unit 108 or a display of the computing device 110) for displaying the selected set of image frames continuously.

In some embodiments, identifying (430) the plurality of image frames of interest, analyzing (440), adaptively selecting (450) the set of image frames, and providing (460) the video abstraction for displaying are performed in real time as the imaging device 216 captures the sequence of image frames (the plurality of image frames 502, FIG. 5) continuously.

In some embodiments, identifying (430) the plurality of image frames of interest, analyzing (440), adaptively selecting (450) the set of image frames, and providing (460) the video abstraction for displaying are performed after the imaging device 216 finishes capturing the sequence of image frames (the plurality of image frames 502, FIG. 5) continuously.

FIGS. 7A-7F are a flow diagram illustrating a method 700 for processing image data captured by an imaging device 216 borne on a movable object 102, in accordance with some embodiments. The method 700 is performed at an electronic device, such as the movable object 102, the imaging device 216, the control unit 108, and/or the computing device 110. In some other embodiments, the method 700 is performed by other electronic device(s), such as a mobile device or a computing device paired with the control unit 108 for operating the movable object 102. Operations performed in FIG. 7 correspond to instructions stored in computer memories or other computer-readable storage mediums of the corresponding device(s).

The electronic device receives (702) a plurality of trigger events (e.g., trigger events 504, FIG. 5). A respective trigger event of the plurality of trigger events corresponds to an operational condition variation detected by a first sensing device borne on the moveable object. The first sensing device is a sensing device of the movable object sensing system 210. For example, the first sensing device is the VO system 328.

In some embodiments, receiving the plurality of trigger events comprises (710) receiving a notification of identifying a keyframe (keyframe identification notification) by the VO system 328 borne on the movable object 102. In some embodiments, the plurality of trigger events correspond (712) to a timing attribute (e.g., a timestamp) of an image frame captured by the imaging device satisfying a predetermined criterion. In some embodiments, the plurality of trigger events correspond (714) to a positional change of the movable object 102 satisfying predetermined criteria. For example, a trigger event corresponds to an attitude change of the movable object 102 greater than a predetermined threshold, or a velocity change of the movable object 102 greater than a predetermined threshold. In some embodiments, the plurality of trigger events correspond (716) to an azimuthal change (e.g., a gimbal orientation change) of the carrier 108 borne by the movable object 102 satisfying a predetermined criterion. The carrier 108 is configured to carry the imaging device 216. In some embodiments, the plurality of trigger events correspond (718) to a plurality of keyframes determined based on a plurality of images captured by the imaging device 216 borne on the movable object 102. In some embodiments, a plurality of image frames captured by the imaging device 216 are analyzed using similar algorithms as the VO system 328 or other sensor system for identifying keyframes.

In response to the plurality of trigger events, the electronic device identifies (704) a plurality of image frames of interest (e.g., image frames of interest 506 of FIG. 5) from a sequence of image frames (e.g., image frames 502 of FIG. 5) captured by the imaging device 216. In some embodiments, each identified image frame of interest is determined by one of the plurality of trigger events. For example, an identified image frame of interest is related to a corresponding trigger event temporally or spatially or both.

In some embodiments, the electronic device compares (720) attitude information (e.g., orientation angles) of the imaging device 216 and attitude information of the VO system 328. In some embodiments, in accordance with a determination that a difference between the attitude information of the imaging device 216 and the attitude information of the VO system 328 satisfies a first predetermined criterion, the electronic device identifies (720) the plurality of image frames of interest that are temporally related to the keyframes identified by the VO system 328. For example, when a difference between the orientation angles of the imaging device 216 and the orientation angles of the VO system 328 is less than a predetermined threshold value, the imaging device 216 and the VO system 328 are determined to be pointing at approximately the same (or similar) direction. When the imaging device 216 and one or more camera of the VO system 328 point to approximately the same direction, the of image frames of interest are identified to be temporally and spatially related to the corresponding keyframes identified by the VO system 328.

In some embodiments, in accordance with a determination that a difference between the attitude information of the imaging device 216 and the attitude information of the VO system 328 satisfies a second predetermined criterion, the electronic device identifies discards (721) one or more keyframes detected by the VO system. For example, the second predetermined criterion includes the difference between orientation angles of the imaging device 216 and orientation angles of the VO system 328 is equal to or greater than a predetermined threshold value. In some embodiments, in accordance with a determination that a difference between the attitude information of the imaging device 216 and the attitude information of the VO system 328 satisfies a second predetermined criterion (e.g., the difference between orientation angles of the imaging device 216 and orientation angles of the VO system 328 is equal to or greater than a predetermined threshold value), the electronic device identifies (722) the plurality of image frames of interest using a model for predicting timing for an image frame of interest to occur. In some embodiments, the difference between the attitude information of the imaging device and the attitude information of the VO system satisfies the second predetermined criterion comprises (723) the difference between orientation angles of the imaging device and orientation angles of the VO system is equal to or greater than a predetermined threshold value. For example, when the difference between orientation angles of the imaging device 216 and orientation angles of the VO system 328 is equal to or greater than a predetermined threshold value, the imaging device 216 and one or more cameras of the VO system 328 point to different directions. The image frames of interest are identified using a predefined model. In some embodiments, the model is created (724) using data including time stamps of previously identified image frames of interest and one or more trigger events associated with the previously identified image frames of interest respectively. In some embodiments, the one or more trigger events correspond (725) to image content change. In some embodiments, the one or more trigger events correspond (726) to previously identified keyframes by the VO system. In some embodiments, the one or more trigger events correspond (727) to state change of the movable object 102.

The electronic device adaptively selects (706), from the sequence of image frames, a set of image frames (e.g., image frames 508, FIG. 5) in accordance with an analysis of a plurality of temporally adjacent image frames of the plurality of image frames of interest.

In some embodiments, the electronic device compares (730) a respective pair of consecutive image frames from the identified plurality of image frames of interest. A respective pair of temporally consecutive image frames includes a first image frame (e.g., image frame of interest 602, FIG. 6A) and a second image frame (e.g., image frame of interest 604, FIG. 6A) subsequent to the first image frame. In some embodiments, in accordance with a determination that a difference in image content between the first image frame and the second image frame is greater than a predetermined threshold, the electronic device selects (732) a first group of image frames (e.g., a group of image frames 606, FIG. 6A) from the sequence of image frames that are captured between the first image frame and the second image frame to be included in the set of image frames for the video abstraction. The difference in image content between two image frames can be measured using many known image similarity comparison algorithms including, but not limited to, cross-correlation, mutual information, sum of squared intensity differences, ratio image uniformity, etc. Among these algorithms, mutual information and normalized mutual information are image similarity measures commonly used for registration of multimodality images while cross-correlation, sum of squared intensity differences and ratio image uniformity are commonly used for registration of images in the same modality.

In some embodiments, the electronic device further verifies (734) the identified plurality of image frames of interest. In some embodiments, the electronic device compares (736) image content of a plurality of consecutive image frames from the identified plurality of image frames of interest. In some embodiments, in accordance with a determination that the plurality of consecutive image frames have differences in image content that are equal to or below the predetermined threshold, the electronic device excludes (738) one or more image frames of interest from the plurality of consecutive image frames from the set of image frames. For example, the electronic device can exclude a false alarm (e.g., false alarm 618, FIG. 6A) after comparing the image content of image frame 618 with the image content of image frame 604 and image frame 608.

In some embodiments, the electronic device selectively samples (740) the plurality of image frames. The electronic device determines a sampling rate (e.g., sampling rate 614, FIG. 6A) for selecting the first group of image frames (e.g., image frames of interest 606, FIG. 6A) between the first image frame (image frame 602, FIG. 6A) and the second image frame (image frame 604, FIG. 6A). In some embodiments, the electronic device determines an image content change rate between the first image frame and the second image frame. The electronic device then selects a sampling rate in accordance with the image content change rate.

In some embodiments, before identifying the plurality of image frames of interest, the electronic device detects (742) duplicate and/or similar keyframes captured by the first sensing device, e.g., the VO system 328. The electronic device excludes (742) trigger events associated with the duplicate and/or similar keyframes from the one or more trigger events. In some embodiments, in accordance with a determination that the movable object 102 repeats a cyclic moving pattern consecutively (e.g., a circular motion 630, FIG. 6B), the electronic device selects (744) the set of image frames captured during a first cycle of the moving pattern for identifying the plurality of image frames of interest. Image frame from the other circles during the cyclic moving pattern are dismissed from being selected as the image frames of interest.

In some embodiments, the electronic device detects (746) a predefined state variation of the movable object by a second sensing device (e.g., the IMU or the temperature sensor) borne on the movable object 102. The electronic device updates (746) the identified image frames of interest in accordance with the detected predefined state variation. In some embodiments, updating the identified image frames of interest includes adding (747) one or more image frames captured by the imaging device that are temporally close to the predefined state variation to the identified image frames of interest. In some embodiments, the state is (748) a cyclic motion. In accordance with a determination that a range of the cyclic motion is less than a predetermined threshold, for example, the movable object 102 statically hovers and rotates along a certain point (the point 650, FIG. 6B), the electronic device adds (748) one or more image frames selected from the sequence of image frames captured by the imaging device to the identified image frames of interest. In some embodiments, the predefined state variation includes a temperature change detected by a temperature sensor. In some embodiments, the second sensing device is (749) an IMU and/or a GPS borne on the movable object 102.

In some embodiments, the electronic device provides (708) the selected set of image frames (e.g., the selected image frames 508, FIG. 5) for displaying continuously. The video abstraction 510 includes the selected set of image frames 508.

In some embodiments, identifying (704) the plurality of image frames of interest, adaptively selecting (706) the set of image frames, and providing (708) the selected set of image frames for displaying continuously are performed (750) in real time as the imaging device 216 captures the sequence of image frames continuously. In some embodiments, identifying (704) the plurality of image frames of interest, adaptively selecting (706) the set of image frames, and providing (708) the selected set of image frames for displaying continuously are performed (752) after the imaging device finishes capturing the sequence of image frames continuously.

Many features of the present disclosure can be performed in, using, or with the assistance of hardware, software, firmware, or combinations thereof. Consequently, features of the present disclosure may be implemented using a processing system. Exemplary processing systems (e.g., processor(s) 202, processors of the control unit 108, processors of the computing device 110, and/or processors of the imaging device 216) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), spread spectrum technology such as FASST or DESST, or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for processing image data captured by an imaging device borne on a movable object, the method comprising:

at an electronic device having one or more processors and memory storing instructions for execution by the one or more processors:

receiving a plurality of trigger events, wherein a respective trigger event of the plurality of trigger events corresponds to an operational condition variation detected by a first sensing device borne on the movable object, and receiving the plurality of trigger events includes receiving a keyframe identification notification from a visual odometry (VO) system borne on the movable object;

in response to the plurality of trigger events, comparing attitude information of the imaging device and attitude information of the VO system;

in accordance with a determination that a difference between the attitude information of the imaging device and the attitude information of the VO system satisfies a predetermined criterion, identifying, among a sequence of image frames captured by the imaging device, a plurality of image frames of interest that are temporally related to a key frame identified according to the keyframe identification notification; and adaptively selecting, from the sequence of image frames, a set of image frames in accordance with a comparison of a plurality of temporally adjacent image frames of the plurality of image frames of interest.

2. The method of claim 1, wherein the predetermined criterion is a first predetermined criterion;

the method further comprising:

in accordance with a determination that the difference between the attitude information of the imaging device and the attitude information of the VO system satisfies a second predetermined criterion, discarding one or more keyframes identified according to the keyframe identification notification.

3. The method of claim 1,
wherein the predetermined criterion is a first predetermined criterion;
the method further comprising:
in accordance with a determination that the difference between the attitude information of the imaging device and the attitude information of the VO system satisfies a second predetermined criterion, identifying the plurality of image frames of interest using a model for predicting timing for an image frame of interest to occur.

4. The method of claim 3, wherein the model is created using data including time stamps of previously identified image frames of interest and one or more trigger events associated with the previously identified image frames of interest respectively.

5. The method of claim 4, wherein the one or more trigger events correspond to at least one of image content change of the image frames captured by the imaging device, previously identified keyframes by the VO system, or state change of the movable object.

6. The method of claim 1, further comprising:
comparing a respective pair of consecutive image frames from the identified plurality of image frames of interest, the respective pair of consecutive image frames including a first image frame and a second image frame subsequent to the first image frame; and
in accordance with a determination that a difference in image content between the first image frame and the second image frame is greater than a predetermined threshold, selecting, from the sequence of image frames, a group of image frames captured between the first image frame and the second image frame to be included in the set of image frames.

7. The method of claim 6, wherein selecting the group of image frames comprising:
determining a sampling rate for selecting the group of image frames between the first image frame and the second image frame, by:
determining an image content change rate between the first image frame and the second image frame; and
selecting the sampling rate in accordance with the image content change rate.

8. The method of claim 1, further comprising:
verifying the identified plurality of image frames of interest by:
comparing image content of a plurality of consecutive image frames from the identified plurality of image frames of interest; and
in accordance with a determination that the plurality of consecutive image frames have differences in image content that are equal to or below a predetermined threshold, excluding one or more image frames of interest of the plurality of consecutive image frames from the set of image frames.

9. The method of claim 1, further comprising:
before identifying the plurality of image frames of interest:
detecting duplicate keyframes captured by the first sensing device; and
excluding trigger events associated with the duplicate keyframes from the plurality of trigger events.

10. The method of claim 1, further comprising:
before identifying the plurality of image frames of interest:
detecting similar keyframes captured by the first sensing device; and
excluding trigger events associated with the similar keyframes from the plurality of trigger events.

11. The method of claim 10, further comprising:
in accordance with a determination that the movable object repeats a cyclic moving pattern consecutively, selecting the set of image frames captured during a first cycle of the moving pattern for identifying the plurality of image frames of interest.

12. The method of claim 1, further comprising:
detecting a predefined state variation of the movable object by a second sensing device borne on the movable object; and
updating the identified image frames of interest in accordance with the detected predefined state variation.

13. The method of claim 12, wherein updating the identified image frames of interest comprises:
adding one or more image frames captured by the imaging device that are temporally close to the predefined state variation to the identified image frames of interest.

14. The method of claim 13, wherein the state is a cyclic motion, and wherein the method further comprises:
in accordance with a determination that a range of the cyclic motion is less than a predetermined threshold, adding one or more image frames selected from the sequence of image frames captured by the imaging device to the identified image frames of interest.

15. The method of claim 1, further comprising:
providing the selected set of image frames for displaying continuously.

16. The method of claim 1, wherein the plurality of trigger events correspond to at least one of:
a timing attribute of an image frame captured by the imaging device satisfying a predetermined timing criterion,
a positional change of the movable object satisfying predetermined position criteria,
an azimuthal change of a carrier borne by the movable object and configured to carry the imaging device satisfying a predetermined azimuthal criterion, or
a plurality of keyframes determined based on a plurality of images captured by the imaging device borne on the movable object.

17. A system for processing image data, the system comprising:
one or more processors; and
memory storing one or more programs to be executed by the one or more processors, the one or more programs including instructions for:
receiving a plurality of trigger events, wherein a respective trigger event of the plurality of trigger events corresponds to an operational condition variation, and receiving the plurality of trigger events includes receiving a keyframe identification notification from a visual odometry (VO) system borne on the movable object;
in response to the plurality of trigger events, comparing attitude information of the imaging device and attitude information of the VO system;
in accordance with a determination that a difference between the attitude information of the imaging device and the attitude information of the VO system satisfies a predetermined criterion, identifying, among a sequence of image frames captured by the imaging device, a plurality of image frames of interest that are temporally related to a key frame identified according to the keyframe identification notification; and adaptively selecting, from the sequence of image frames, a set of image frames in accordance with a comparison of a plurality of temporally adjacent image frames of the plurality of image frames of interest.

18. An unmanned aerial vehicle (UAV), comprising:
a propulsion system;
one or more sensing devices;
an imaging device; and
one or more processors coupled to the propulsion system, the one or more sensing devices, and the imaging device, the one or more processors configured for:
receiving a plurality of trigger events, wherein a respective trigger event of the plurality of trigger events corresponds to an operational condition variation detected by a first one of the one or more sensing devices, and receiving the plurality of trigger events includes receiving a keyframe identification notification from a visual odometry (VO) system borne on the movable object;

in response to the plurality of trigger events, comparing attitude information of the imaging device and attitude information of the VO system;

in accordance with a determination that a difference between the attitude information of the imaging device and the attitude information of the VO system satisfies a predetermined criterion, identifying, among a sequence of image frames captured by the imaging device, a plurality of image frames of interest that are temporally related to a key frame identified according to the keyframe identification notification; and adaptively selecting, from the sequence of image frames, a set of image frames in accordance with a comparison of a plurality of temporally adjacent image frames of the plurality of image frames of interest.

* * * * *